United States Patent
Barnhill, Jr. et al.

(10) Patent No.: US 7,363,247 B1
(45) Date of Patent: Apr. 22, 2008

(54) ONLINE PRODUCT ORDERING METHOD AND SYSTEM

(75) Inventors: Robert B. Barnhill, Jr., Baltimore, MD (US); James R. Gaarder, Hunt Valley, MD (US); Thomas E. Throckmorton, New Freedom, PA (US); Christopher Joseph Vaughan, Reisterstown, MD (US); Matthew J. Toll, Columbia, MD (US); Bryon Bronner, Westminster, MD (US)

(73) Assignee: Tessco Communications Incorporated, Hunt Valley, MD (US)

( * ) Notice: Subject to any disclaimer, the term of this patent is extended or adjusted under 35 U.S.C. 154(b) by 1617 days.

(21) Appl. No.: 09/609,336

(22) Filed: Jun. 30, 2000

(51) Int. Cl.
*G06Q 30/00* (2006.01)
(52) U.S. Cl. .......................... 705/26; 705/27
(58) Field of Classification Search .................. 705/26, 705/27
See application file for complete search history.

(56) References Cited

U.S. PATENT DOCUMENTS

| | | | |
|---|---|---|---|
| 4,964,043 A | 10/1990 | Galvin | |
| 5,193,056 A | 3/1993 | Boes | |
| 5,745,681 A | 4/1998 | Levine et al. | |
| 5,799,284 A | 8/1998 | Bourquin | |
| 5,890,175 A | 3/1999 | Wong et al. | |
| 5,897,639 A | 4/1999 | Greef et al. | |
| 5,905,973 A | 5/1999 | Yonezawa et al. | |
| 5,960,411 A | 9/1999 | Hartman et al. | |
| 6,009,413 A | 12/1999 | Webber et al. | |
| 6,014,639 A | 1/2000 | Fohn et al. | |
| 6,023,686 A | 2/2000 | Brown | |
| 6,026,376 A * | 2/2000 | Kenny | 705/27 |
| 6,026,377 A | 2/2000 | Burke | |
| 6,029,143 A | 2/2000 | Mosher et al. | |
| 6,032,129 A | 2/2000 | Greef et al. | |
| 6,032,145 A | 2/2000 | Beall et al. | |

OTHER PUBLICATIONS

"verix Software Announces Availability of Vertix eSales 2.1, The Enterprise Selling Solution." Business Wire, p. 4220088, Apr. 22, 1998.*

* cited by examiner

*Primary Examiner*—Matthew S. Gart
(74) *Attorney, Agent, or Firm*—Shlesinger, Arkwright & Garvey LLP

(57) ABSTRACT

A method for ordering products online comprises providing a server system for connection to a client system, said server system including a product database; allowing the client system to be connected to the server system; displaying on the client system a worksheet having rows and columns, two of said columns comprising empty fields; allowing a customer operating the client system to build the worksheet with products desired to be ordered by filling in the empty fields with the product stock number included in the product database and corresponding quantities; and allowing the customer to submit the worksheet to the server system to obtain a quote as to product price and availability or direct the delivery by ordering the products listed thereon.

23 Claims, 28 Drawing Sheets

| TESSCO.com | About TESSCO.com | Contact Us | Products | Markets | Track Order | LogOn |

TESSCO                          Logon

I'm a New User

Sign me up!

Logon

User Name: [ ]
Password: [ ]
☐ Remember Password
[Logon]
Forgot your password?

Welcome to TESSCO.com

The most innovative and effective knowledge, transaction and service internet site in the wireless communications industry!

TESSCO.com's powerful, integrated search and transaction engine allows customers to:

- Find, compare and select products;
- Build complete purchasing worksheets;
- Obtain customer-specific pricing and availabilty;
- Reserve inventory, and
- Place and track their orders.

It is quickly becoming the medium of choice for wireless procurement

FIG. 10

```
TESSCO.com    About TESSCO.com | Contact Us | Products | Markets          Track Order | LogOn
TESSCO                                                                    Relationship To register to use TESSCO.com, you must already have
              a TESSCO account. If you don't have a TESSCO account
              number, click here.

Otherwise, please click "Next".

[Next]
```

FIG. 11

```
TESSCO.com    About TESSCO.com | Contact Us | Products | Markets          Track Order | LogOn
TESSCO                                                                New Web Customer Enter your TESSCO account number and the zip code
              or postal code for its billing address.
                        Account Number:  [     ]
                        Zip Code/Postal Code: [        ]
                                  [Back] [Next]
```

FIG. 12

```
TESSCO.com    About TESSCO.com | Contact Us | Products | Markets          Track Order | LogOn
TESSCO                                                              New  UserName
```

Please specify a user name that will uniquely identify you
to the TESSCO site. If the name you pick is not unique in
the TESSCO database, you will be prompted to choose another.

User Name: [          ]

[Back] [Next]

FIG. 13

```
TESSCO.com    About TESSCO.com | Contact Us | Products | Markets          Track Order | LogOn
TESSCO                                                              Registration
```

Account Number: 2275399
User Name: user

First Name*: [          ]
Middle Name: [          ]
Last Name*: [               ]
Email*: [                  ]
PIN: [      ]
Location ID: [Beverly Hills, CA (2 Elm Road) ▼]

*denotes required fields

[Back] [Next]

| TESSCO.com | About TESSCO.com | Contact Us | Products | Markets | | Track Order | LogOff |

*TESSCO*

My Worksheet

| My Worksheet | Find | Order | My Account |

Products by Worksheet Order

Category
Tessco Part Number
Mfg. Part Number
Description

Current Worksheet: MY WORKSHEET
Owner: admin

| Line No. | TESSCO Part No. | Order Qty. | Unit of Measure | Description |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |

FIG. 19

| | | | | |
|---|---|---|---|---|
| TESSCO.COM FIND>BUILD>CONFIRM>ORDER>TRACK | | | HELP \| FEEDBACK | |
| Products | | | | |
| Markets | Sinclair Technologies Inc. | | | |
| Product Support | | | | |
| Knowledge Tools | | | | |
| Contact Us | | | | |
| Corporate | | | | |
| | Description Search Results For : buick mount | | | |
| >HOME< | Description | TESSCO Part No. | Manufacturer Name | Mfg Part No. | Quantity/ Add To Worksheet |
| | PRO-FIT custom cellular phone mount for a 1995-98 Buick Riviera with center console shift only. Complete instructions included | 64730 | Pro-Fit International | BK5195 | 1 |
| | PRO-FIT custom cellular phone mount for a 1992-1994 Buick Park Avenue, LeSabre and 1992-93 Oldsmobile 88/98. Complete instructions included. | 66181 | Pro-Fit International | BK5092 | 1 |
| | PANAVISE In dash custom cellular phone mount for 1995-96 Buick Century. Complete instructions included. | 12039 | Pana Vise | 75108-395 | 1 |
| | Panavise in Dash | | | | |

| TESSCO.com | About TESSCO.com | Contact Us | Products | Markets | | Track Order | LogOff |

TESSCO  My Worksheet

My Worksheet | Find | Order | My Account

Current Worksheet: MY WORKSHEET
Owner: admin

| Line No. | TESSCO Part No. | Order Qty. | Unit of Measure | Description |
|---|---|---|---|---|
| 1 | 57305 | 1 | 1 EACH | Buick Regal GS/LS Mount |
| 2 | 61094 | 4 | 1 EACH | 97-98 Park Avenue Mount |
| 3 | 60867 | 1 | 1 EACH | Cellular Duplexer B Band |
| 4 | 34642 | 2 | 1 EACH | 824-896 10dB Fiberglass |
| 5 | 10830 | 1 | 1 EACH | Batt. Nokia 5100/6100/7190 |
| 6 | 32077 | 3 | 1 EACH | OCP 860/1960 Head set JBA |
| 7 | 26677 | 1 | 1 EACH | #0-#2 Strand Servit Post |
| 8 | 78890 | 1 | 1 EACH | Wood pole mount 10-22" |
| 9 | 82263 | 6 | 100 PACK | 14-4 Ga. Lug 1/4"Hole/100 |
| 10 | | | | |

| TESSCO.com | About TESSCO.com | Contact Us | Products | Markets | | Track Order | LogOff |

TESSCO   My Worksheet

| My Worksheet | Find | Order | My Account |

Get Quote
Submit Order

Current Worksheet: MY WORKSHEET
Owner: admin

| Line No. | TESSCO Part No. | Order Qty. | Unit of Measure | Description |
|---|---|---|---|---|
| 1 | 57305 | 1 | 1 EACH | Buck Rega GS/LS Mount |
| 2 | 61094 | 4 | 1 EACH | 97-98 Park Avenue Mount |
| 3 | 60867 | 1 | 1 EACH | Cellular Duplexer B Band |
| 4 | 34642 | 2 | 1 EACH | 824-896 10dB Fiberglass |
| 5 | 10630 | 1 | 1 EACH | Batt, Nokia S100/B100/7190 |
| 6 | 32077 | 3 | 1 EACH | OCP 860/1960 Head set JBA |
| 7 | 26677 | 1 | 1 EACH | #0-#2 Strand Ser-it Post |
| 8 | 78890 | 1 | 1 EACH | Wood pole mount 10-22" |
| 9 | 82263 | 6 | 100 PACK | 14-4 Ga. Lug 1/4"Hole/100 |
| 10 | | | | |

FIG. 28

| | TESSCO | | | | | | | | Confirm Price & Availability | |
|---|---|---|---|---|---|---|---|---|---|---|
| | | | Shipping Options | Adv. Shipping | Place Order | | | | | |

| Bill To | | | | Ship To | | | | | |
|---|---|---|---|---|---|---|---|---|---|
| 1 Main Street<br>Brewster, NY 10509 | | | | 2 Elm Road<br>Beverly Hills, CA 90710 | | | | | |
| Line No. | TESSCO Part Number | Order Qty. | Product Description | Unit of Measure | Weight (lbs.) | Avail. Qty. | Back Order Qty. | Unit Price ($US) | Extended Price ($US) |
| 1 | 57305 | 1 | Buick Regal GS/LS Mount | 1 EACH | 0.25 | 1 | 0 | $14.20 | $14.20 |
| 2 | 61094 | 4 | 97-98 Park Avenue Mount | 1 EACH | 1.00 | 4 | 0 | $14.20 | $57.80 |
| 3 | 60867 | 1 | Cellular Duplexer B Band | 1 EACH | 16.00 | 1 | 0 | $836.50 | $836.50 |
| 4 | 34642 | 2 | 824-896 10dB Fiberglass | 1 EACH | 33.00 | 2 | 0 | $976.50 | $1,953.90 |
| 5 | 10639 | 1 | Batt. Nokia 5100/6100/7190 | 1 EACH | 0.25 | 1 | 0 | $18.36 | $18.36 |
| 6 | 32077 | 3 | OCP 860/1960 Headset JBA | 1 EACH | 0.30 | 3 | 0 | $49.44 | $130.32 |
| 7 | 26677 | 1 | #8-#2 Strand Servit Post | 1 EACH | 1.00 | 1 | 0 | $16.53 | $16.53 |
| 8 | 76980 | 1 | Wood Pole Mount 19-22 | 1 EACH | 97.00 | 0 | 1 | $194.75 | $194.75 |
| 9 | 82263 | 6 | 14-4 Ga. Lug 1/4" Hole/100 | 100 PACK | 3.19 | 0 | 6 | $142.12 | $852.72 |

PRICES QUOTED ARE FOR QUOTATION ONLY!

Retail Value ($US): $0.00
Shipping Method: Freight
Shipping Weight: 201.99 lbs.

Product Cost ($US): $4,074.08
P&DG Charge ($US): $179.00
Sales Tax ($US): $0.00

This quote was given at 6/2/00 3:45:34 AM

Order Total ($US) $4253.08

ONLINE PRODUCT ORDERING METHOD AND SYSTEM

FIELD OF THE INVENTION

The present invention relates generally to a computer method and system for ordering products online, particularly through the Internet.

BACKGROUND OF THE INVENTION

More and more entities are establishing their presence in the Internet as a way of growing their business and lowering costs. With the proliferation of personal computers and the popularity of the Internet, companies have decided to set up websites where customers can visit the stores, browse through the products and hopefully make a purchase.

Companies that sell to other companies ("business-to-business") are following the examples set by earlier websites that sell to consumers. With the convenience and ease of ordering supplies from a desktop computer, including the convenience of browsing through or searching an electronic catalog, sales to other businesses through the Internet are increasing.

To make the experience of purchasing online as familiar as possible with one purchasing in a brick-and-mortar store, a shopping cart model has been developed. In this model, items selected by the purchaser are added to a shopping cart. As the customer continues to shop, however, he is not always aware of how many items are in his cart, unless he clicks the icon for the shopping cart, or goes to the check-out stage of the system, at which time the contents of the shopping cart would be displayed. If the customer decides to remove items from the shopping cart, he can only do so when the contents are visible.

The shopping cart model is also not suitable for repeatedly purchasing the same items. Typically, no provision is provided in the system where the customer can simply enter a stock number and proceed to the check-out stage. The customer would have to browse through the website to find the product he wants and only then can he add it to the shopping cart. As in a brick-and-mortar store, the layout is designed to get the customer through most of the aisles with the expectation that he would purchase more items than he actually needs. The same would be true for an online store where browsing is encouraged. In a business-to-business context, this model would be time consuming.

The shopping cart model is also not suitable for the incorporation of a tiered pricing system. The present invention enables the customer to take advantage of lower per item tiered pricing as the customer meets certain pricing tier thresholds as more items are added to the worksheet.

The present invention is directed at making the selling of products and configuration of products to other businesses more convenient than by using a shopping cart model on-line or by ordering over the telephone or by faxing a purchase order.

The present invention is an Internet-based system that gives the customer the knowledge, configuration, delivery and control tools to manage product procurement. This system gives the customers the online knowledge tools needed to make purchasing decisions, configure complete solutions to their procurement needs, eliminate inventory, achieve on-time product delivery and low-cost procurement operation. The system begins with the ability to select and evaluate possible choices via product searches, then continues with the "Worksheets". "Worksheets" allow customers to configure solutions to their purchasing needs. The worksheet process leads the customer from order configuration to confirming product price and inventory availability. Once product price and availability are confirmed, the system then provides the customer with the opportunity to reserve the product on the worksheet for a specified time period or to direct delivery of product by converting the worksheet into an order. Finally, the present invention gives customers control in many forms, including the ability to access their order history and track deliveries. Control is also provided in the form of templates, which allow customers to preselect which products their employees are authorized to purchase.

Although the present invention was developed primarily for selling to other businesses, it should be understood that the invention would be equally applicable to selling to consumers.

OBJECTS AND SUMMARY OF THE INVENTION

It is an object of the present invention to provide an online product ordering system wherein a list of products selected by the customer is always displayed.

It is another object of the present invention to provide an online product ordering system that displays a worksheet to the customer that contains a list of products he has selected for purchase, thereby providing a constant status of his selection.

It is yet another object of the present invention to provide an online product ordering system that displays a worksheet of the products selected for purchase and where the worksheet, including the products list, can be saved and later retrieved and cloned in its entirety or line-item by line-item into another worksheet, thereby saving the customer time in searching for products.

It is another object of the present invention to provide an online product ordering system where the worksheet can be saved as a template, and then later imported in its entirety or line-item-by-line-item for use in building another worksheet.

In summary, the present invention provides a method for ordering products online, comprising providing a server system for connection to a client system, said server system including a product database; allowing the client system to be connected to the server system; displaying on the client system a worksheet having rows and columns, two of said columns comprising empty fields; allowing a customer operating the client system to build the worksheet with products desired to be ordered by filling in the empty fields with the product stock number included in the product database and corresponding quantities; and allowing the customer to submit the worksheet to the server system to obtain a quote or order the products listed thereon.

The present invention also provides a client server system for ordering products online, comprising a client server system including a database for products. The system includes means for displaying a worksheet on a client system. The worksheet includes empty fields for entry by a customer of stock numbers and corresponding quantities of the products to be ordered. The system includes means for searching for a product from the database and adding the product to the worksheet and means for submitting the filled-in worksheet to order the products listed thereon.

These and other objects of the present invention will become apparent from the following detailed description.

BRIEF DESCRIPTIONS OF THE DRAWINGS

FIGS. 8-31 are screen shots of the online product ordering system of the present invention.

DETAILED DESCRIPTION OF THE INVENTION

The following definitions will be used throughout.

Customer: An individual or business who uses or purchases from the company website.

Registration: The act of a customer entering an account number, ZIP code or postal code of his billing address, Personal Identification Number (PIN) and other data into certain input fields on the homepage in order to be able to use the website.

Personal Identification Number (PIN): A 12-digit number securely stored at the individual level within a website account which, when provided by the customer during website registration, grants the customer the ability to purchase or view products online.

Account: The official relationship or agreement with the website by which a customer is able to complete a registration on the website and be authorized to view and purchase products on the website.

SKUs: Unique stock numbers used to identify the products in the website owner's inventory offered for sale. An abbreviation of Stock Keeping Unit.

Worksheet: The stage of the website through which registered customers input SKUs and quantities to be ordered, determine product price and availability, find products, retrieve other worksheets or templates and edit for ordering purposes and other functions.

Template: A bill of materials a registered customer can customize from a worksheet, store locally or globally (with the website owner assistance) and import from to build orders on the website. Templates also serve as a control allowing customers to preselect which products their employees are authorized to purchase.

Order: A completed, confirmed website worksheet that has been submitted electronically by a registered customer to the website back-end order entry system to direct the delivery of product. Submitted orders are stored within a website account, as well as in the website owner's Legacy system.

Quote: A confirmation of worksheet's account-based pricing and inventory availability that is shown to the customer prior to order placement.

Cloning: The act of copying an entire existing worksheet or order into an active worksheet for the purposes of placing a new order on the website.

Importing: The act of copying an entire template or line items within a template or existing order for the purposes of placing a new order on the website.

Multiply: Adjusting the multiplication feature on a the website template to a quantity of greater than one so that a template (in its entirety or individual line items within) can be selected and imported more than once at a time into a worksheet.

Reservation: Feature on the website that permits certain customers to hold a quote confirming product price and availability for a specified period of time.

Figure 1:
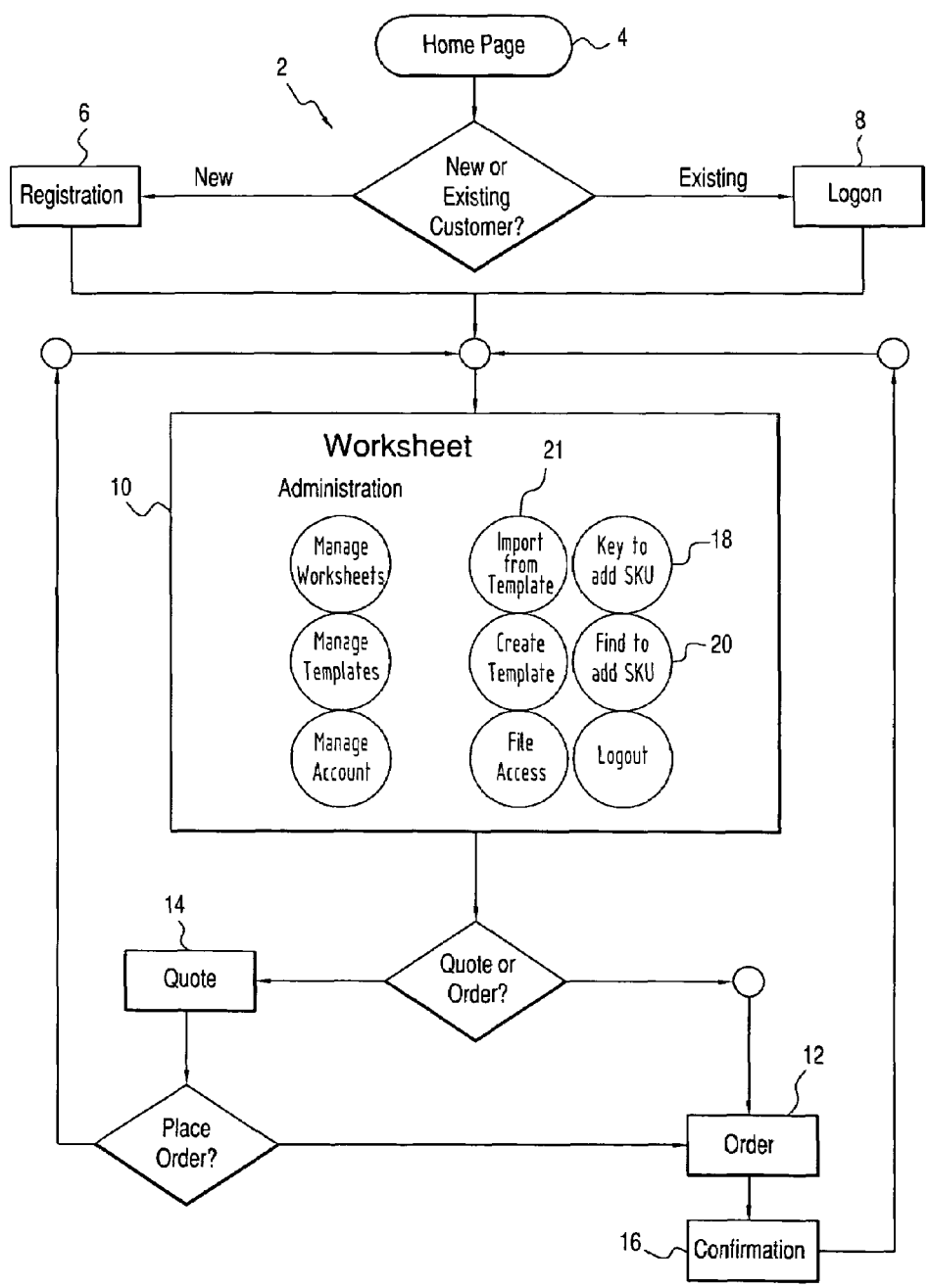
FIG. 1 is a flowchart of an online product ordering system in which a worksheet is used to list the products to be ordered.

An online product ordering system 2 made in accordance with present invention is disclosed in FIG. 1. The ordering system is accessed by connecting to a home page 4 via a network, such as the Internet. For a new customer, registration at 6 is required before access into the system is allowed. For an existing customer, access is provided after logging on at 8.

At registration, the customer will need an account number, the ZIP or postal code of his billing address, and personal identification number (PIN-provided to him by an account representative) to place the orders. First-time visitors to the homepage enter their registration information, create a username and password, and then proceed to a worksheet. Repeat visitors simply enter their username and password to logon at 8 to a worksheet.

Once the customer has been allowed access into the system, he is then taken to a worksheet stage 10.

The worksheet stage 10 displays a worksheet that allows the customer to start to build or configure an order. The worksheet (see FIG. 16) is a table containing lines and columns. Two columns are empty fields for entering SKUs and quantities. The other columns are completed automatically by the system after entry of the SKUs. The worksheet is "built" or "configured" by filling in the blank fields with the desired products.

The worksheet stage 10 provides the means by which the customer is able to organize SKUs and quantities, in a very versatile manner, and direct the delivery of product by placing orders over the Internet. The worksheet stage allows the customer the following features:

1. The ability to "clone" existing worksheets in their entirety or line-item-by-line-item and build a new worksheet.
2. The ability to "clone" previously-submitted orders in their entirety or line-item-by-line-item and build a new worksheet.
3. The ability to store and manage bill of material "templates" containing specific SKUs and quantities and import them in their entirety or line-item-by-line-item into a current worksheet.
4. The ability to import multiple copies of entire templates into a current worksheet.
5. The ability to reserve a quotation of product pricing and availability for a finite period of time, then retrieve the quote and either direct the delivery of product by placing the order or void the quotation.

After the worksheet is completed, the customer may direct the delivery of product by placing the order at 12 or request a quote as to product price and availability at 14. After an order is placed, confirmation at 16 is sent to the customer and the worksheet is updated with pricing and availability.

Figure 2:
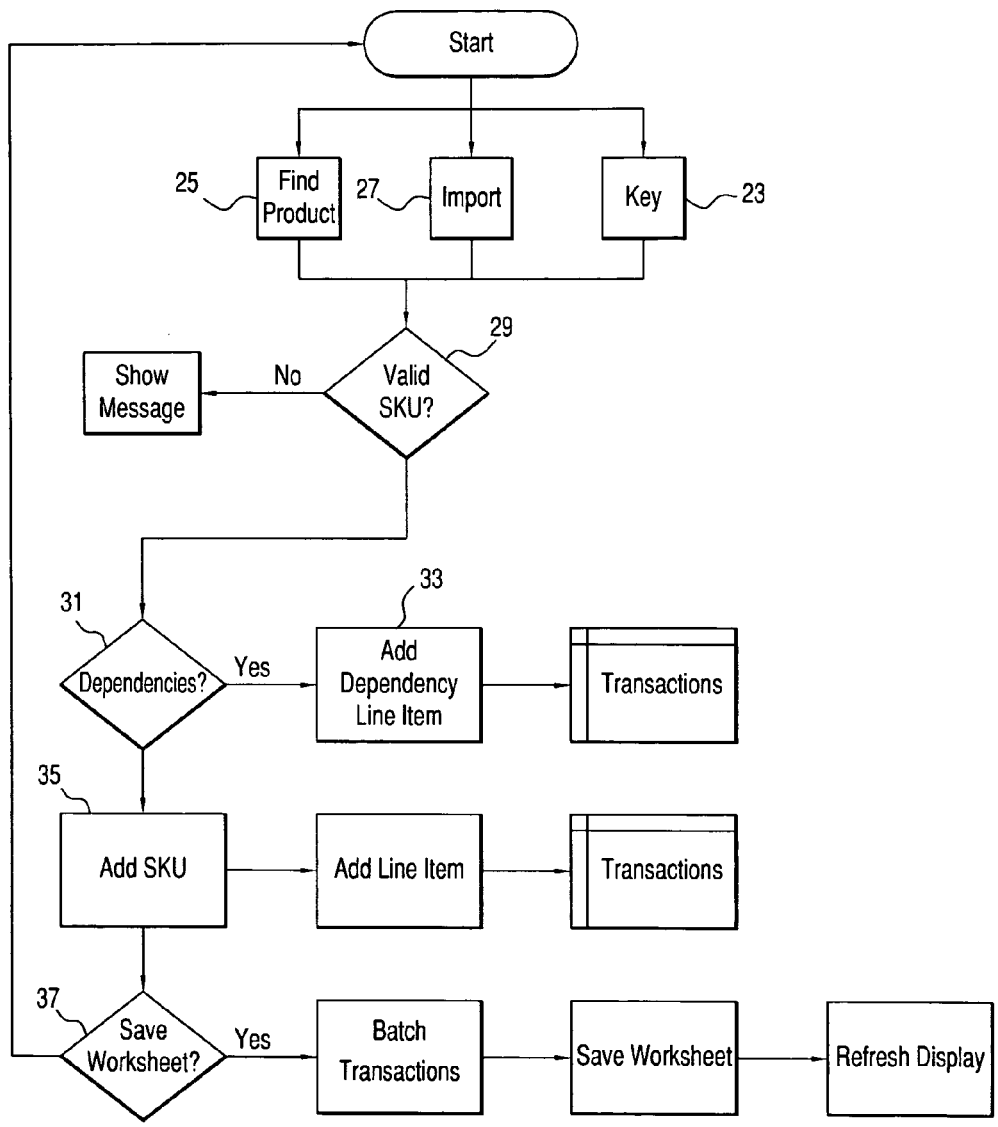
FIG. 2 is a flowchart of entering an order using a worksheet.

The worksheet stage 10 includes a component 18 to allow the customer to key in SKUs directly into the worksheet, component 20 for using the knowledge tools provided on the website to find a product through one of several search types, and component 21 for importing SKUs and quantities from a template. Referring to FIG. 2, a worksheet is built or configured by filling in the empty fields by keying in the SKUs at 23, finding products through searches at 25 or importing product SKUs from a template at 27. The SKU is determined for validity at 29 and dependency at 31. For example, the length of cable ordered will determine whether and what size reel will be needed to ship with the cable. A line item is added to the worksheet at 33 for the dependency and its corresponding transactions are placed in memory. The SKU is added at 35 to dependency item. Transactions are created but are not written yet to the database. When the customer asks to save the worksheet at 37, all pending transactions are batched to the database using remote script calls. The worksheet moves the pending transactions into the completed transaction list to allow for future rollback of transactions.

Figure 3:
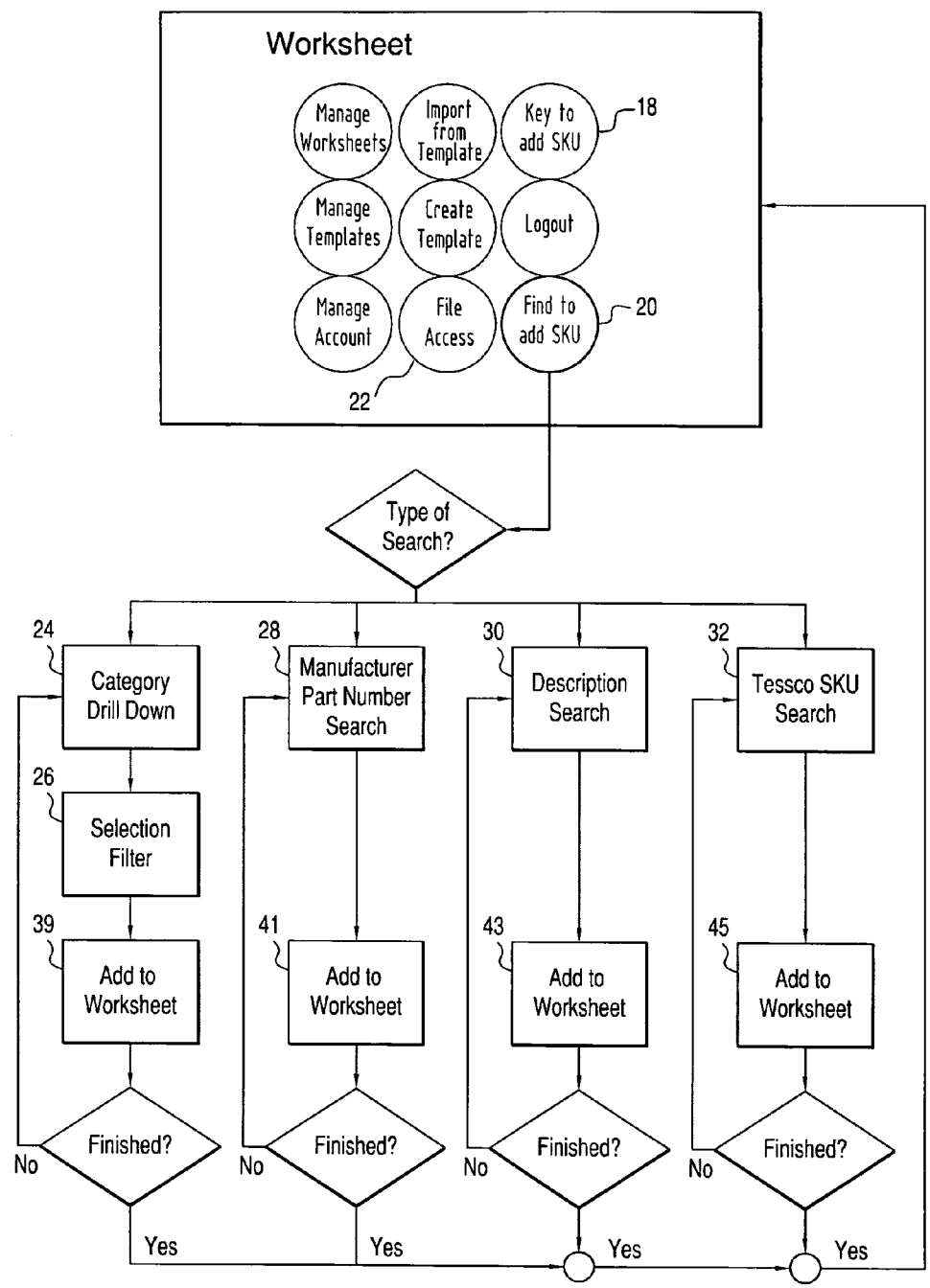
FIG. 3 is a flowchart showing several types of product searches to build a worksheet.

Referring to FIG. 3, the customer, using any of four products searches, is able to access a search from a worksheet, find the product(s) he needs, and adds them to the worksheet. One product search is choosing among several product categories and "drilling down" (by filtering among certain product characteristics) at 24 and 26 to a certain level, comparing them in column display format, and adding them to the worksheet at 39. Another product search is by searching for the manufacturer part number (MPN) at 28 and adding the product at 41. Yet another way of finding a product is by searching the products database by keywords at 30, such as a three-field keywords search that matches a word or words used to describe products with all the product descriptions within the database and adding the product to the worksheet at 43. Still another way of searching for products is by the SKU search at 32 by typing all or part of any SKU needed into a single field and adding the product at 45. The product is added to the worksheet by clicking the appropriate area on the display.

Figure 4:
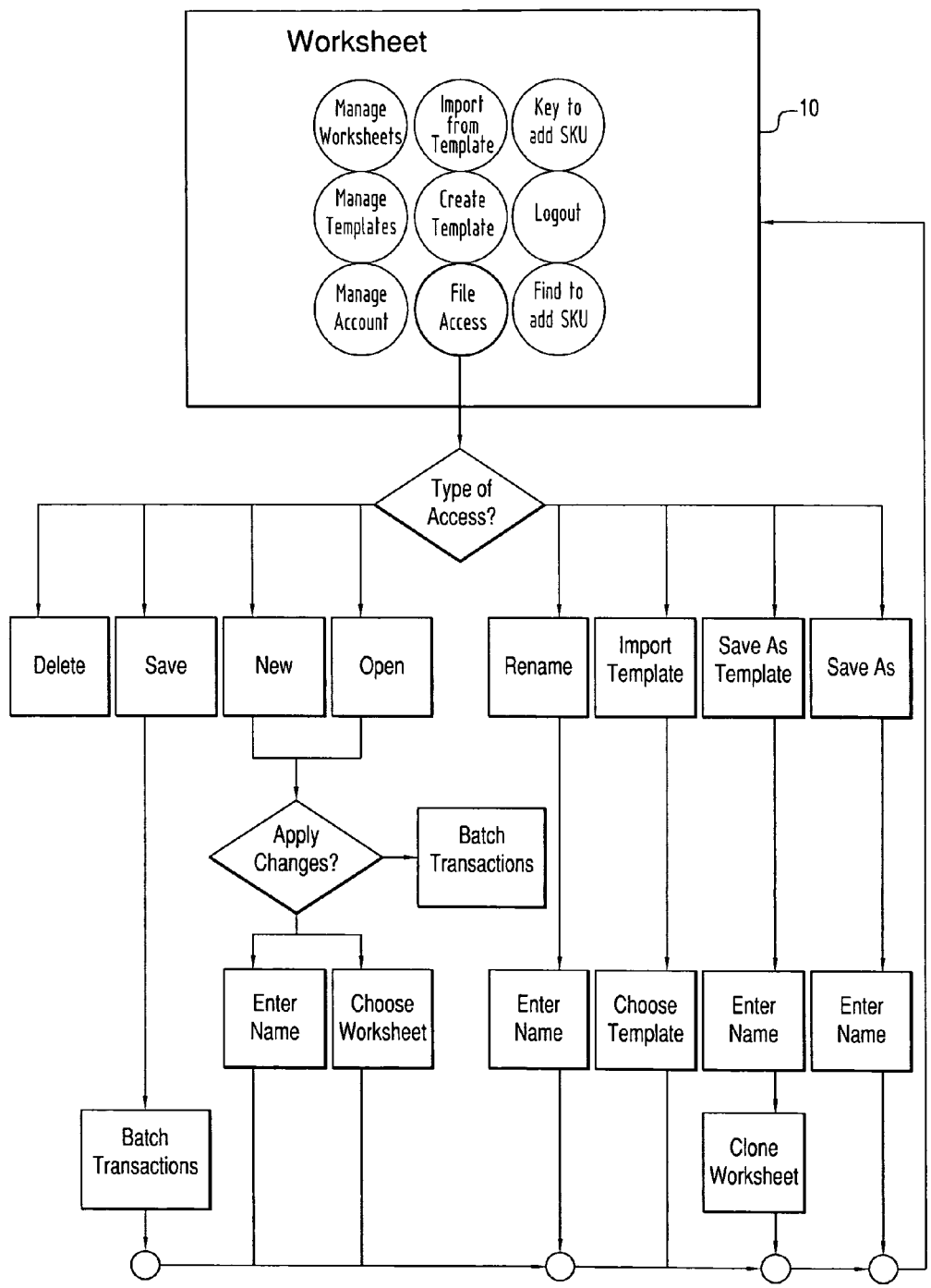
FIG. 4 is a flowchart showing that a worksheet, template and prior orders can be stored, retrieved and cloned.

Another way of building a worksheet is by cloning or importing SKUs, quantities and other product data into an active worksheet from multiple sources. Referring to FIG. 4, the worksheet stage 10 allows the customer to store, retrieve and "clone" worksheets, as well as import templates and prior orders he is authorized to access. From a worksheet, if a customer knows of a previously created worksheet that contains SKUs and quantities he needs, he can select an existing worksheet from a list, open it and clone the worksheet in its entirety. The customer can also import certain line items of SKUs and quantities from templates. The customer can also search for an existing worksheet based on its name or by date range. Once cloned or imported into an active worksheet, the line items from the existing worksheet can be ordered. The customer can perform the same exact cloning from previously submitted orders that he can search for, select from and clone into an active worksheet.

Figure 5:
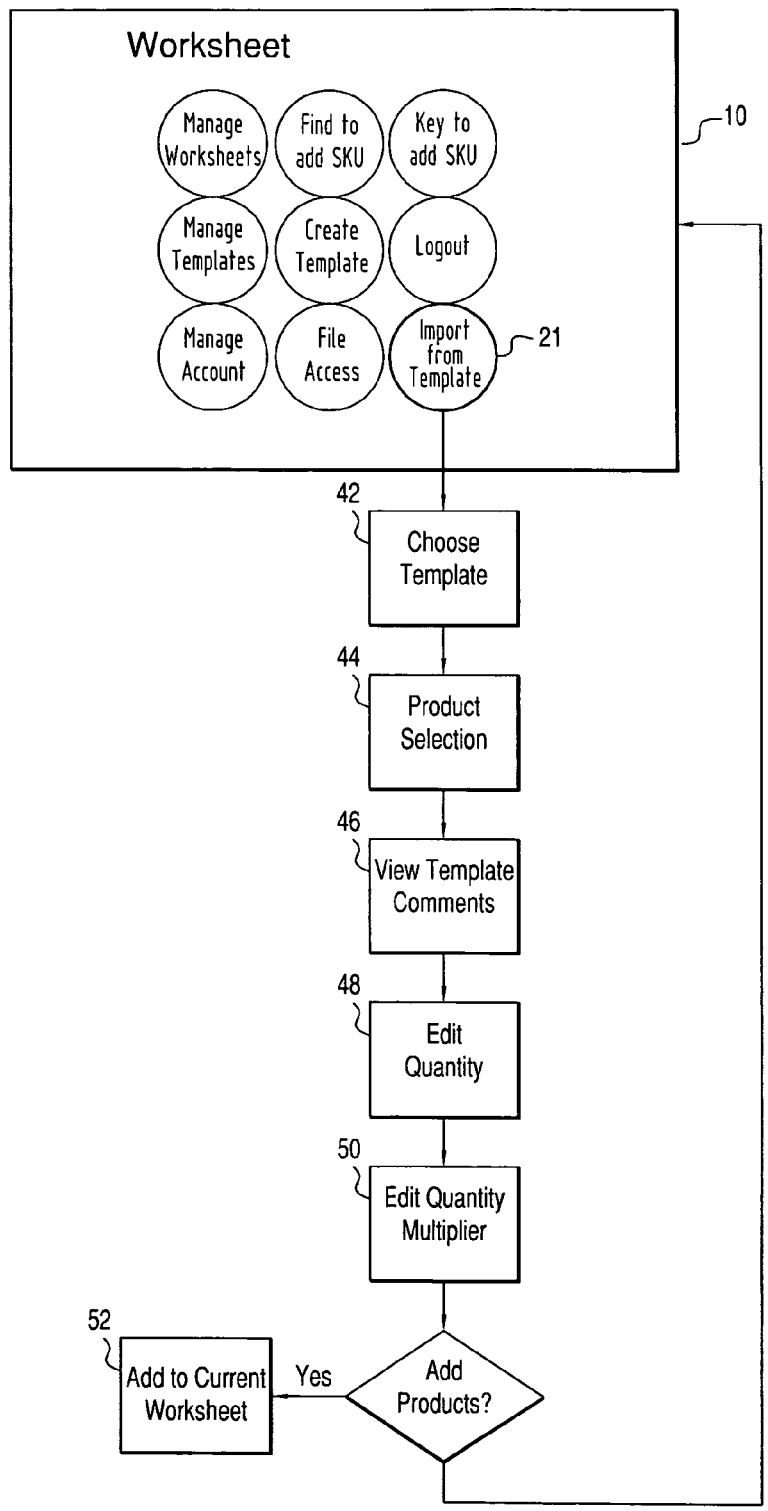
FIG. 5 is a flowchart showing the process of importing a template into a worksheet.

SKUs and quantities can also be imported from a template. Referring to FIG. 5, the worksheet stage 10 also provides the capability to save a worksheet as a template which can be later accessed to build a worksheet. Templates are pre-configured bills of materials (BOMs), created at the convenience of customers, which appear to be like a worksheet or a stored order but provide some additional functional advantages to customers. First, templates can be customized and stored so that the line items contained within represent SKUs and specific quantities of those SKUs needed by customers who want to repeatedly and rapidly order BOMs or "kits" from the website owner. Second, customers with access to templates can select all or individual line items from them, adjust quantities if necessary, and import the items into an active worksheet. Third, the template can be "multiplied". Customers typically need to order more than one BOM or kit at a time. As a result, the system provides the customer the ability to specify and order more than one template at a time.

Referring again to FIG. 5, a template from a list is chosen at 42 and loaded. A template will have typically have several line items of products with corresponding SKUs and quantities. Product selection is made at 44. Template comments may be viewed at 46. Quantity of each product may be changed at 48. The number of times to order the template may be changed at 50. The items shown in the template may then be added to the worksheet at 52.

Additional worksheet stage features include the ability to build and save a template from an active worksheet, retrieve or complete order history and certain administrative tools to assist the customer with managing and controlling the product procurement process. Among these, managing worksheets and templates is a menu-driven capability available to the customers. A "Preferences" feature allows customers to choose the scope of worksheets and templates they have access to: their own, theirs and co-workers' at their office location, theirs and co-workers' within their account regardless of location, or "global" list of standard worksheets or templates available to customers. Customers can also edit the contents of existing worksheets and templates. With templates, this includes the ability to store "comments" in one of the columns. Comments can be anything customers want to include within the line items of templates, be they descriptive text about the item or numerical references. They are identifiers that can be stored and edited within templates.

Figure 6:
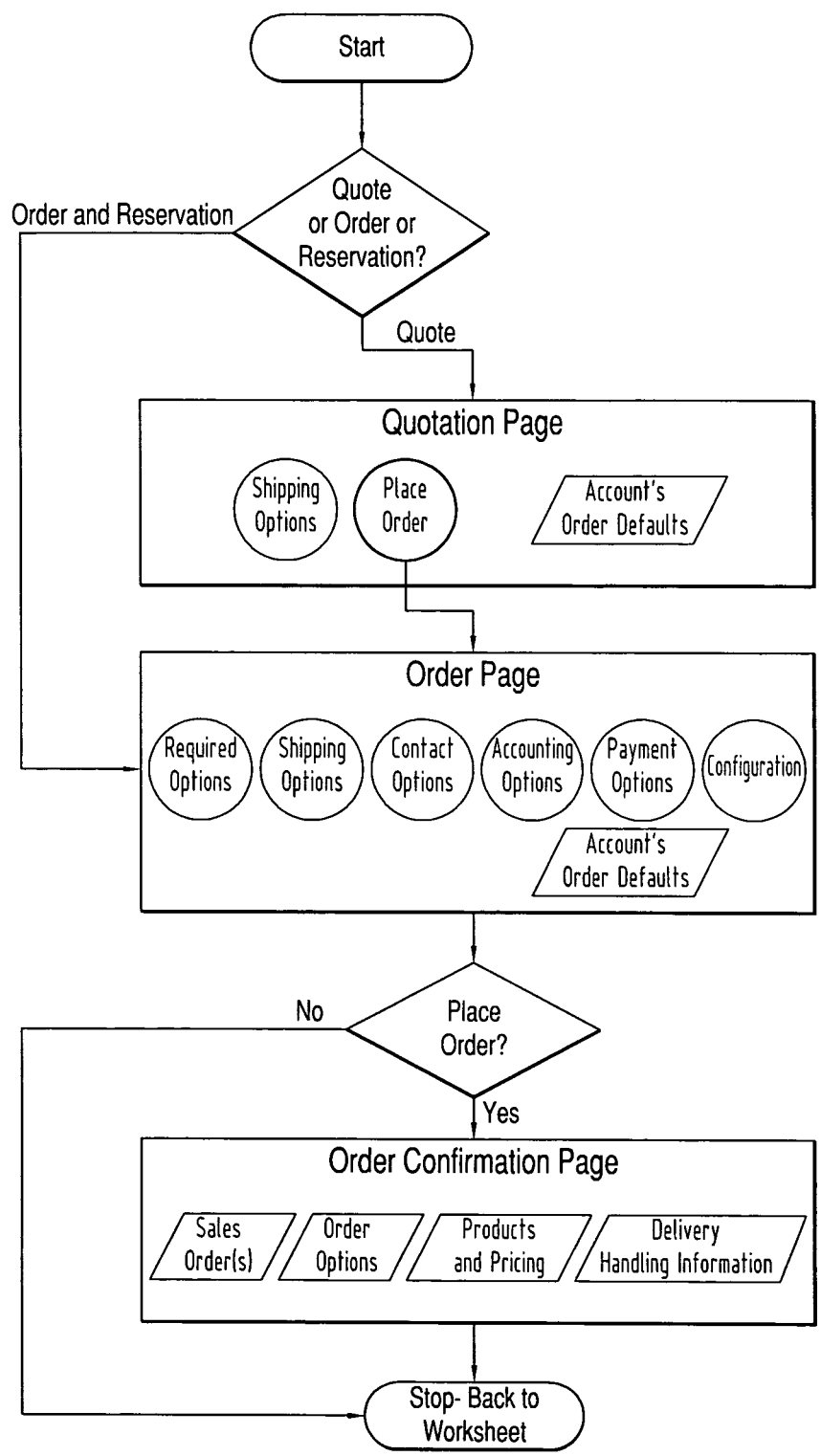
FIG. 6 is a flowchart showing the order process which is reached when a worksheet is submitted to place an order or quote.

Referring to FIG. 6, the customer proceeds from the worksheet stage to either obtain a quote as to product price and availability or direct the delivery of product by placing an order. If the customer wishes to place an order, the customer provides the website with a purchase order (P/o) number, use administrative features such changing or specifying shipping instructions, and submit the worksheet to the website. If the customer chooses to get quotes prior to order placement, he proceeds to the quote stage where he confirms account-based pricing and inventory availability. Pricing is calculated by the invention in accordance with the website owner's tiered pricing structure. This structure works by counting the dollar value of all purchases made (including the pending quote or order) during the calendar month by the customer from the website owner (regardless of whether orders were placed on the website, by telephone, facsimile transmission or other means) for purposes of establishing the customer's pricing tier.

Another distinct feature available to the customer who gets quotes of product price and availability is the "reservation" feature. Certain customers will be presented with an additional button on the quote page that, when clicked, will generate an application that reserves the quote (pricing and inventory) for a specified time period. Customers can logoff and return within the allotted time and either direct the delivery of product by submitting the quote as an order or void the quote.

Figure 7:
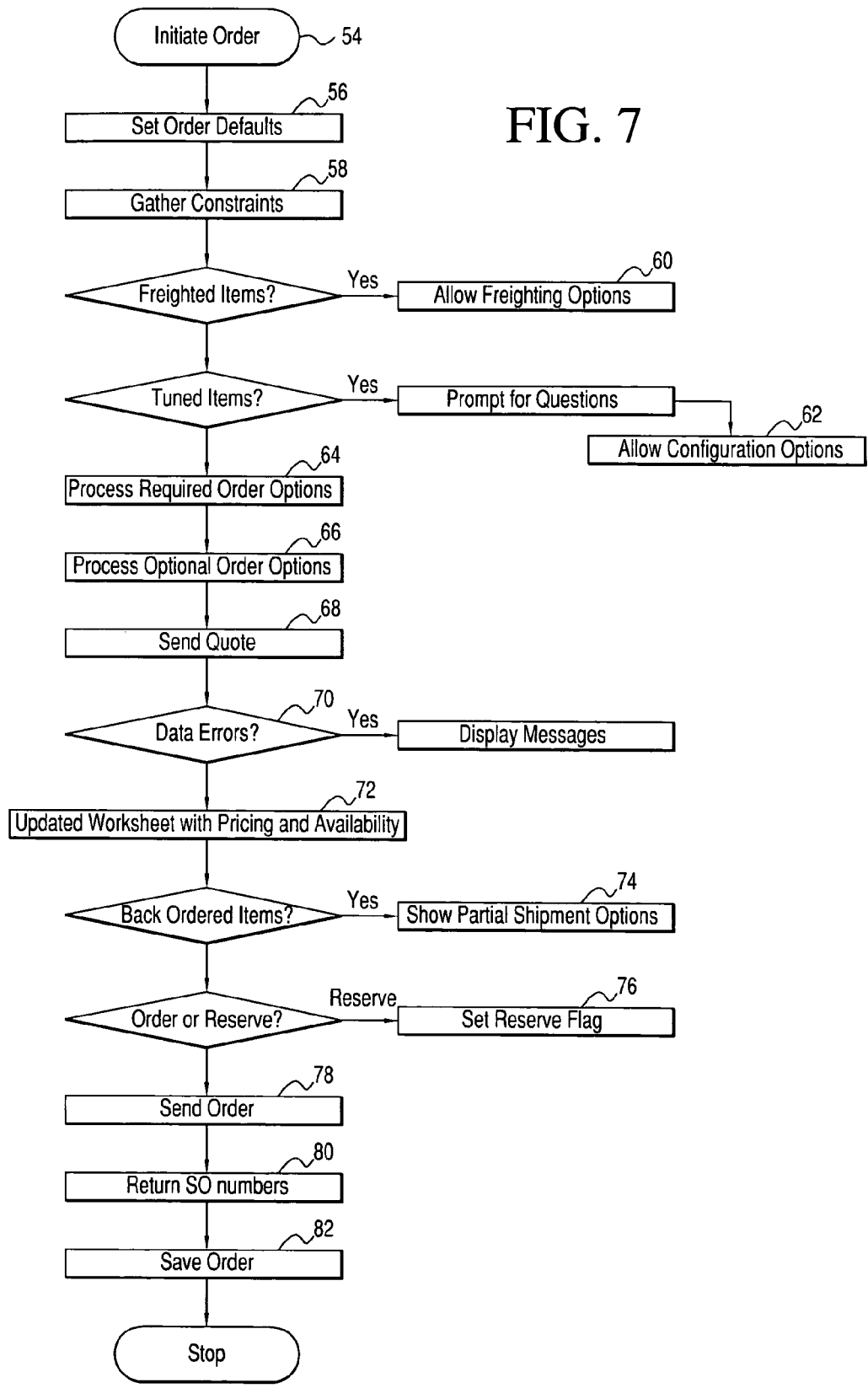
FIG. 7 is a flowchart showing the ordering process after a worksheet has been submitted.

Referring to FIG. 7, the customer initiates the order process at 54. Order defaults are set at 56 and constraints for the products are gathered at 58. If the items require freight shipping, options may be selected at 60. If the items need to be tuned or configured, options are provided at 62. The options are processed at 64 and 66 and a quote is sent to the customer at 68. Errors in the transmitted data are detected at 70. The worksheet is then updated with pricing and availability at 72. If the some of the items are not in stock, they are back ordered and the customer may select partial shipment at 74. The customer may reserve the order, which is then flagged at 76. If the customer proceeds with directing the delivery of product by placing the order, it is sent to the website 78 for fulfilment and a sales order number is provided at 80. The order is then saved at 82.

Figure 8:
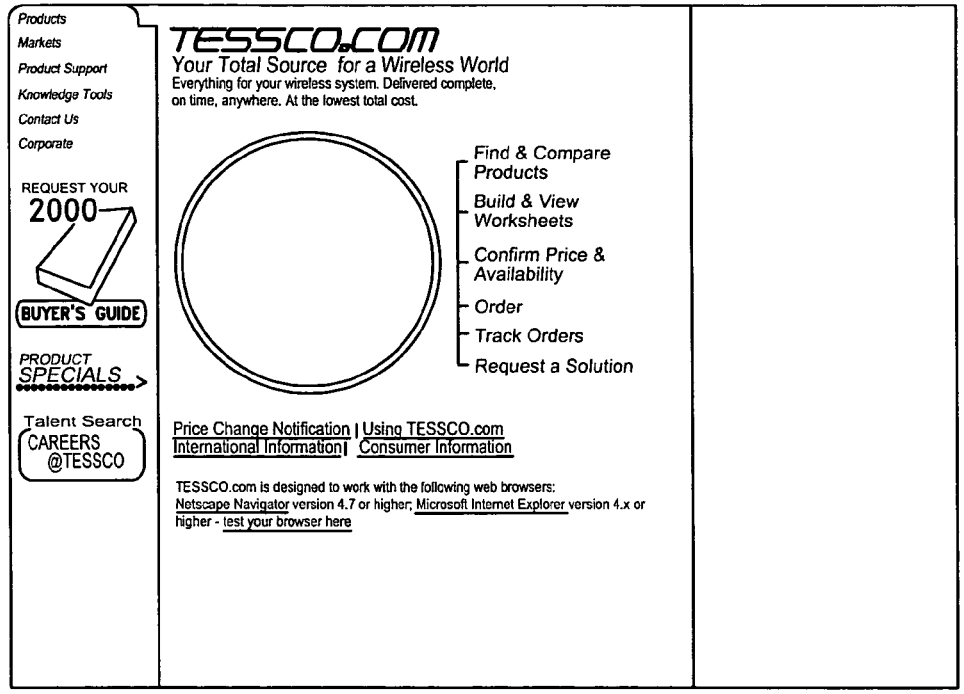
Figure 9:
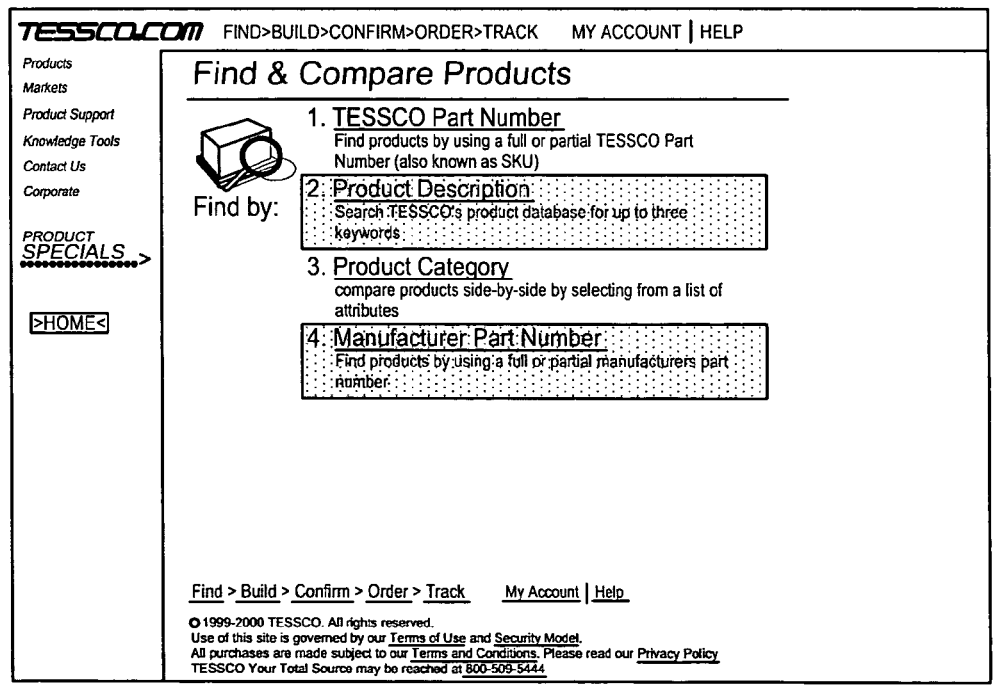

A homepage of the website is shown in FIG. 8. By clicking "Find and Compare Products", the customer can access the product search page, shown in FIG. 9. As discussed above, product searches may be done in one of the following:

1. Website Part (SKU) Number: all or partial search on SKU number.
2. Product Description: keyword search.
3. Product Category: a browse of the Buyer's Guide, an electronic version of the company's product catalog.
4. Manufacturer Part Number: all or partial search on MPN.

In order to direct the delivery of product by placing orders on the website, the customer must first register. FIG. 10 is a logon page. For a return visitor to the website, the user name and password are simply entered and the "Logon" is clicked. First time visitors will have to click "Sign me up!" to complete the initial registration process, shown in the following web pages.

Referring to FIG. 11, a customer needs to have his account number (and other information) ready when registering on the website. Without an account, the customer cannot direct the delivery of product by placing orders on the website.

Referring to FIG. 12, the customer enters his account number along with the ZIP code (domestic) or postal code (international) of his billing address on file with the company.

Referring to FIG. 13, the customer creates his own unique user name. If the user name already exists in the registration database, the customer will be prompted to choose another one.

Referring to FIG. 14, the customer is further identified with at the website as well as to confirm his purchasing authority by entering his name, e-mail address and his company-assigned personal identification number (PIN).

Figure 15:
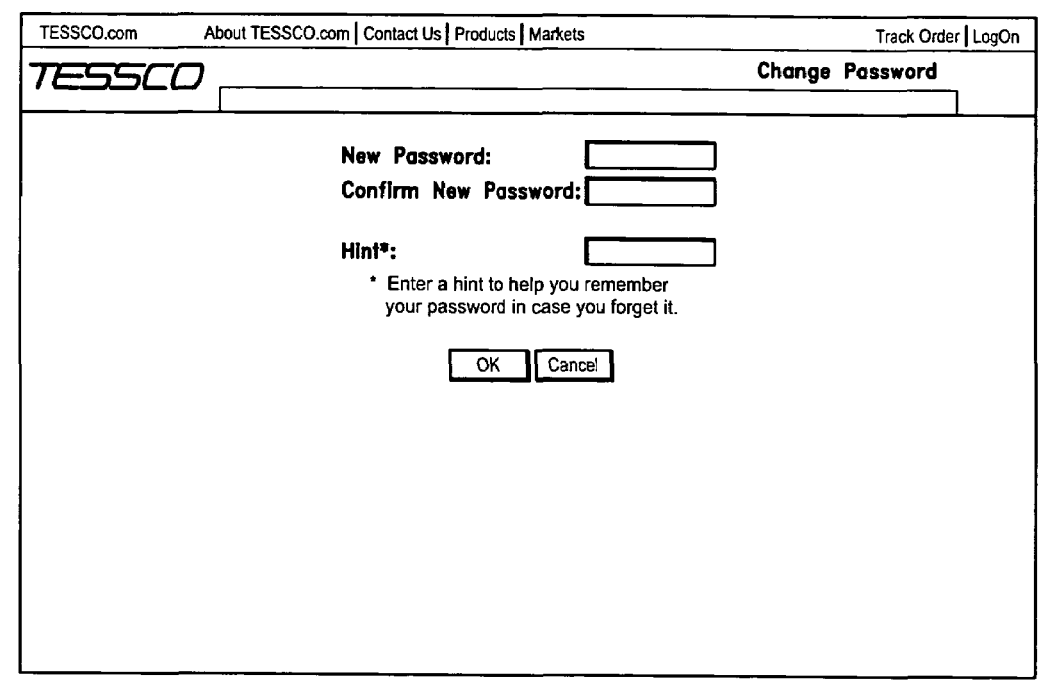

Referring to FIG. 15, the final step in the initial registration process is to create the customer's own password, confirm it by typing it again and then providing a hint for future reference in case the customer forgets the password.

Figure 16:
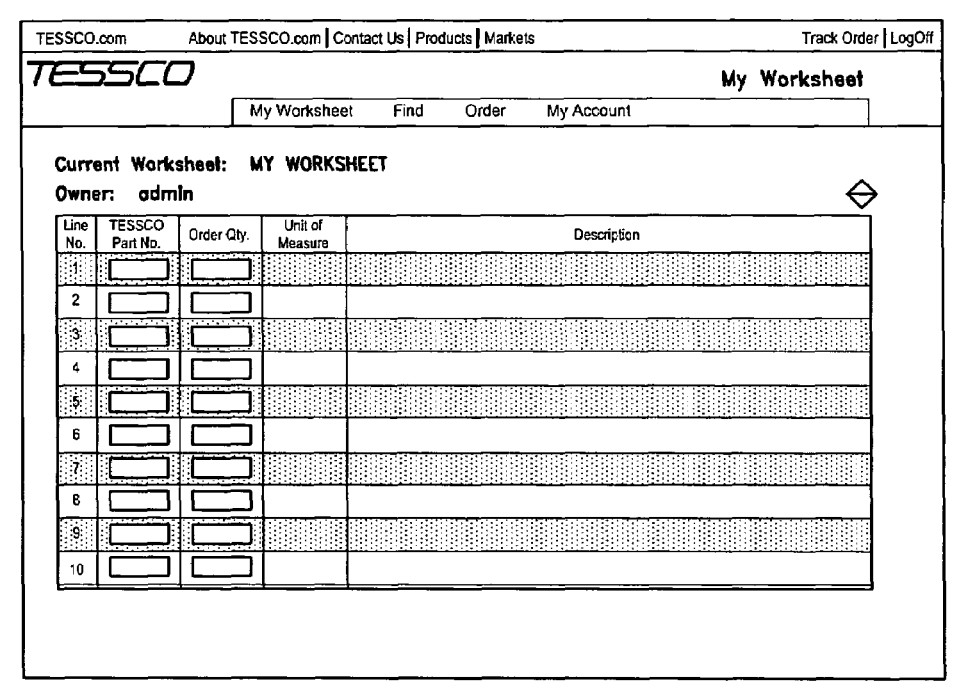
Figures 17, 18:
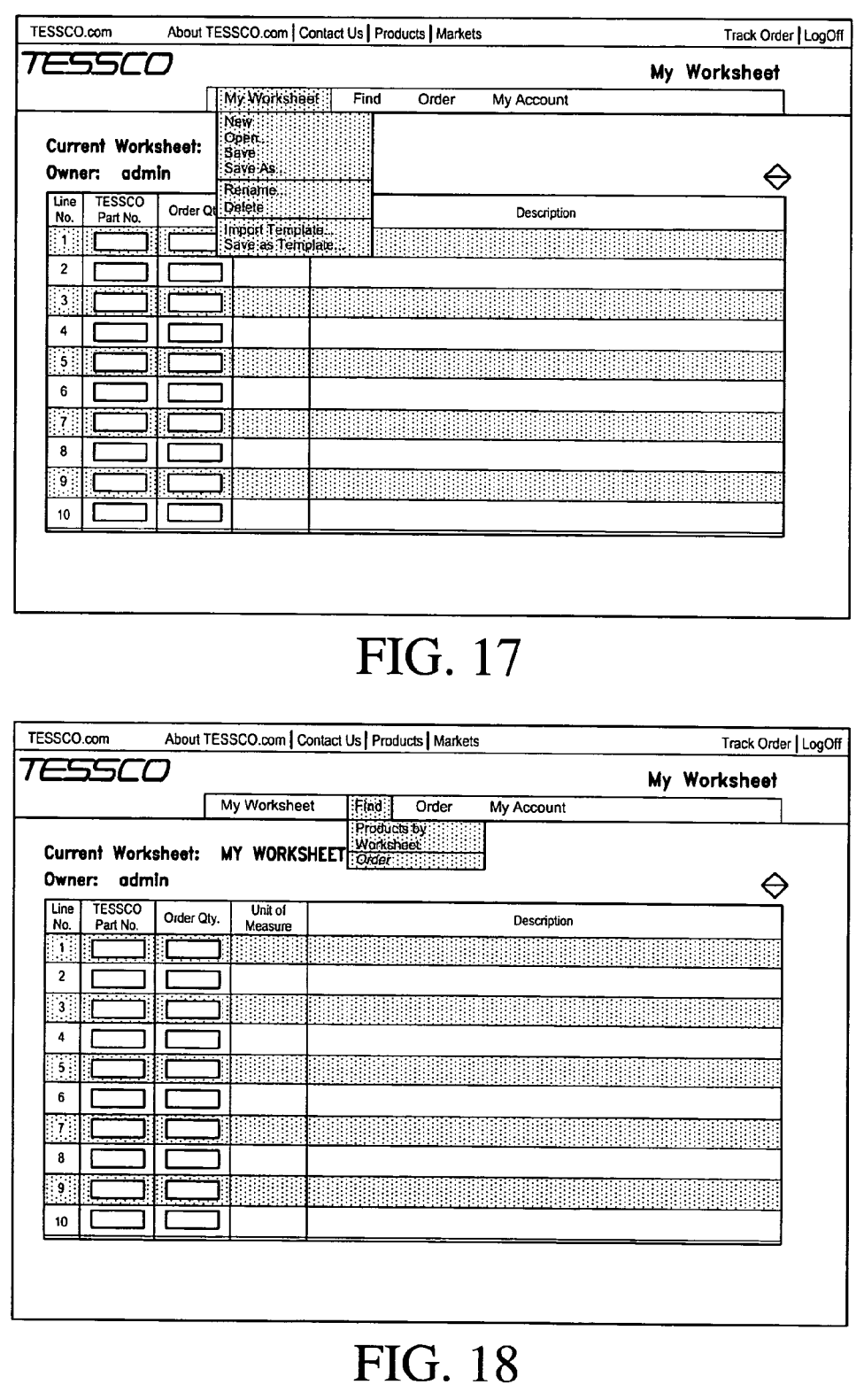

Referring to FIG. 16, a worksheet page is displayed after the logon process is completed. The worksheet page is where the customer begins to configure his order on the website. The worksheet has empty fields for the SKUs numbers and quantities. Several functions are available via the "My Worksheet" pull-down menu, as shown in FIG. 17. "New" opens a new blank worksheet. "Save" saves the contents of the active worksheet. "Rename" allows the customer to rename his worksheet.

As discussed above, there are several ways to build (fill-in) the worksheet on the website. One way is to add SKUs to it by "importing" the SKUs from an existing worksheet or template. "Open" is used to access one of the customer's worksheet. "Import Template" is used to open and select from a pre-configured list of SKUs and associated quantities.

A worksheet can be built from scratch and saved as a template via the "Save As Template" feature.

Referring to FIG. 18, if the customer does not know exactly what he needs to order and has to do some research, a way to build or configure a worksheet is to use the knowledge tools provided on the website to find products and add the products to the worksheet. This is done by using the "Find" menu. The "Find" menu can also be used to search for an existing worksheet or previously submitted order by criteria such as name or date submitted.

Figure 20:
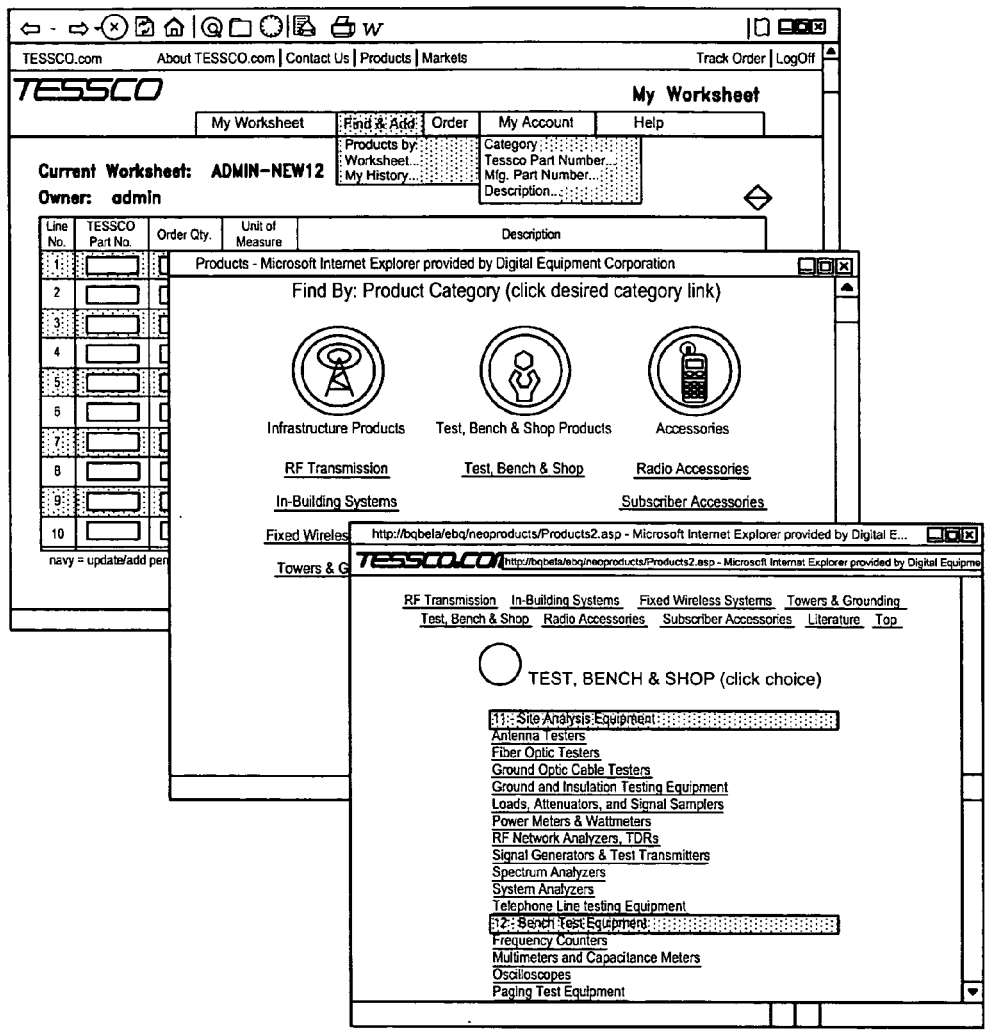

Referring to FIG. 19, the "Find" pull-down menu and the "Products by >" gets the customer to the four website product searches. Referring to FIG. 20, the "Category" search enables the customer to browse the entire website Buyer's Guide by choosing the section (tab), group and sub-group of the SKUs customer is looking for. The search can then be narrowed by selecting among various product characteristics to find and compare the products the customer needs. When one of the categories is clicked, a window pops up showing a listing of product groups and sub-groups under the category chosen. One of the sub-groups is clicked to further narrow down or "drill" into the database. Product search is further narrowed by clicking on the product characteristics until the product is found, which is then added to the worksheet.

Figure 21:
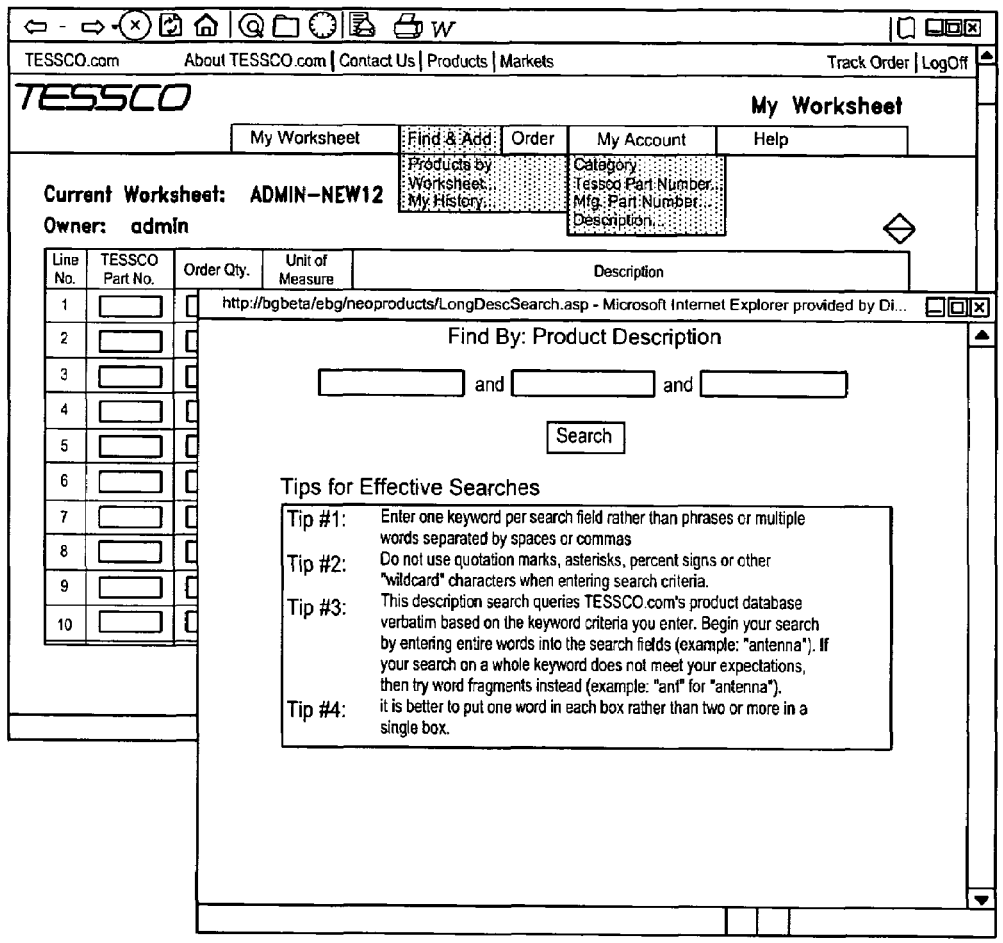

Referring to FIG. 21, the customer can also find a product to build a worksheet by using a product description search. This search is a multi-field search utilizing keywords that describe the product. The website searches for matches within the product database. A typical search result is shown in FIG. 22.

Figure 23:
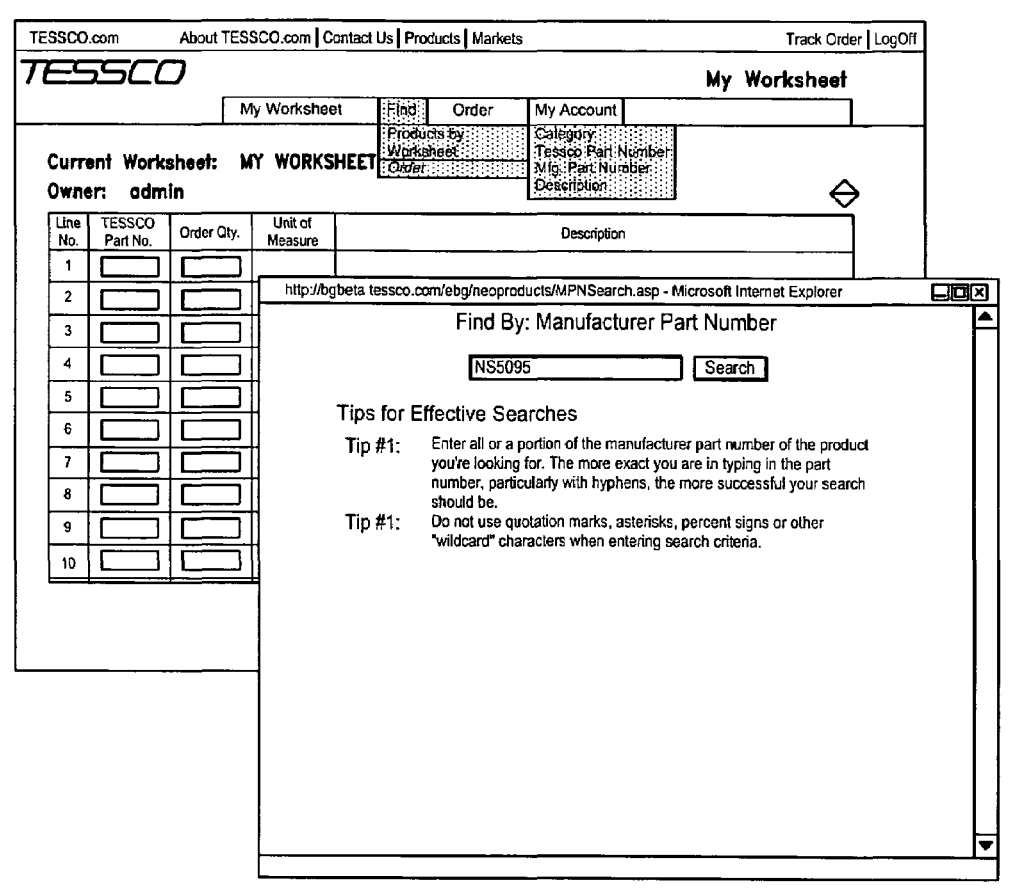

Another product search for use in building or configuring a worksheet is by searching for manufacturer part number. Referring to FIG. 23, a separate window pops up containing the search interface when this type of search is selected. After the customer gets the search results, he is able to add products in specific quantities directly to the worksheet.

Figure 25:
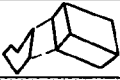

Referring to FIG. 24, a worksheet may also be configured by typing the SKU number directly into the blank fields of the worksheet. If an invalid SKU number is entered, the customer will be prompted to change it. As the SKU number is entered and tabbed over to its quantity field, the color of the SKU changes, signifying that the customer can click on the SKU and obtain a detailed product specification, as shown in FIG. 25. Units of measure and description are provided for the customer's convenience. Page-up and page-down buttons are provided to view all the line items.

Figure 26:
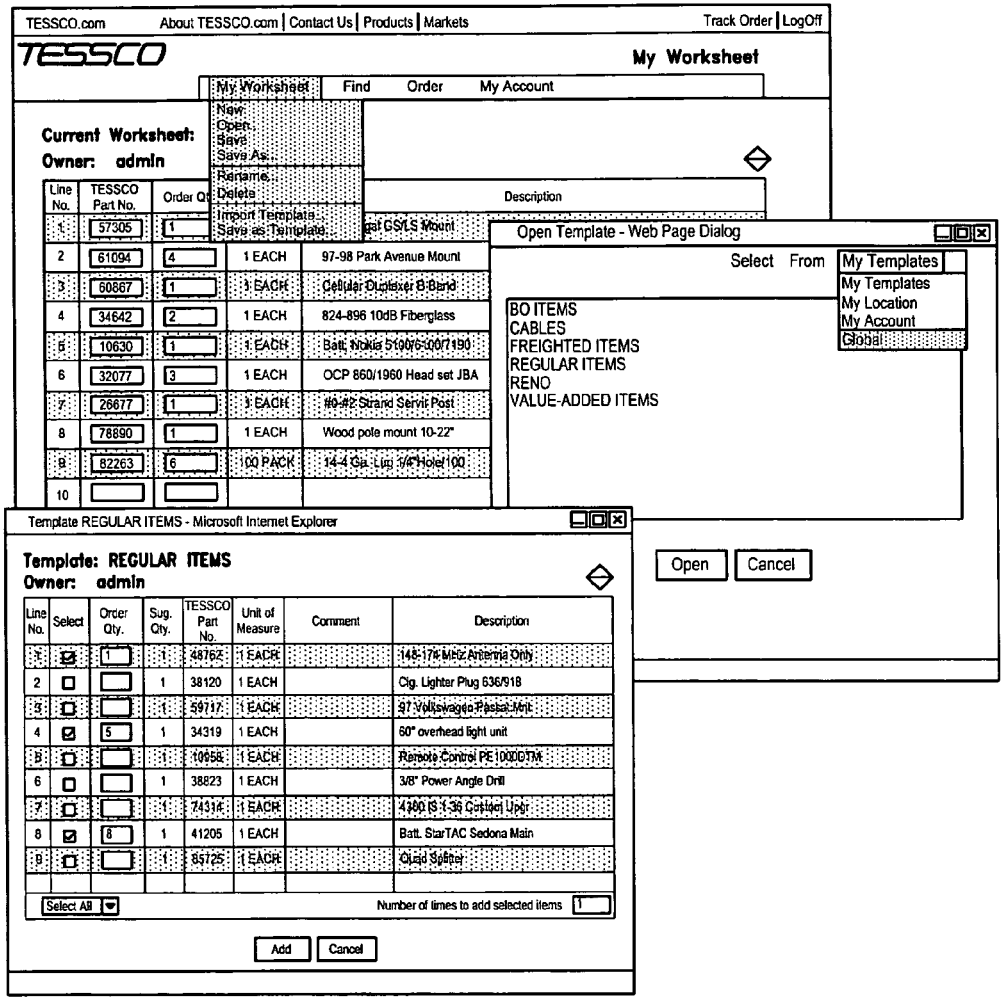

The ability to "import" or select and add SKUs from a template is illustrated in FIG. 26. When the "Import Template" option from the "My Worksheet" menu is clicked, a separate window pops up from which the template to use to pick SKUs is selected. The selected template pops up in a separate window and the customer then makes selection (adjusting quantities as desired) and clicks the "add" button to add the items to the active worksheet. The "Comment" column is available for free text or numbers.

Figure 27:
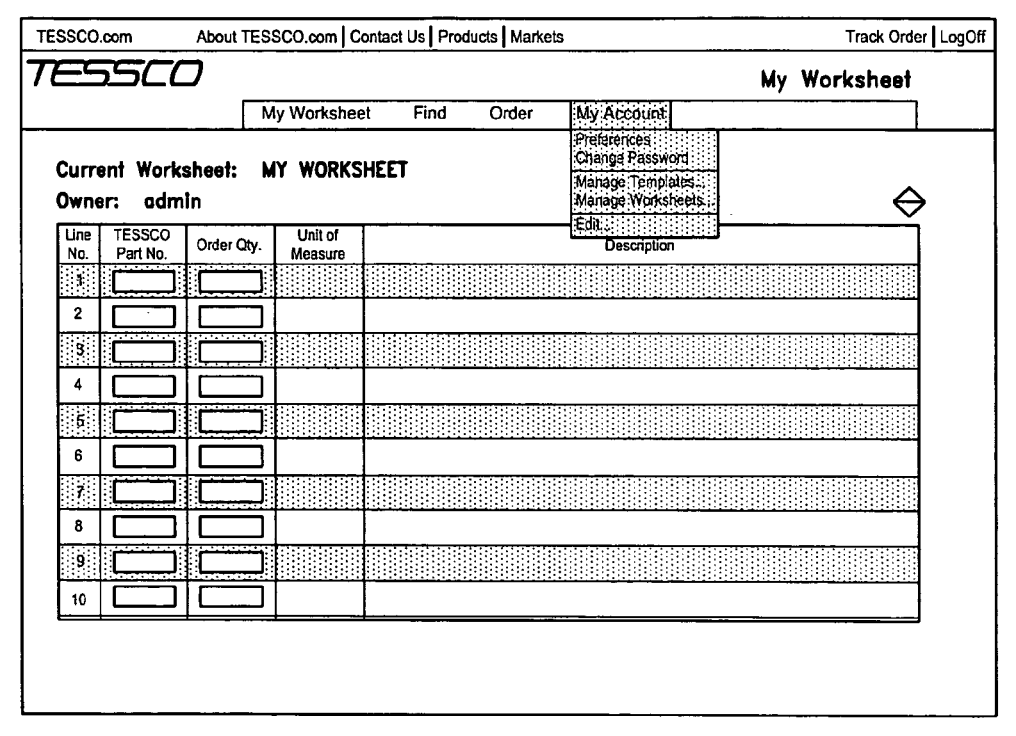

Referring to FIG. 27, the "My Account" menu gives the customer certain administrative tools to assist the customer in managing and controlling the product procurement process. The customer can change the attributes of stored templates and worksheets with the "Manage" functions for each. "Change Password" and "Edit" allow the customer to make changes to other registration information. "Preferences" is a feature that gives the customer the flexibility to set up the worksheet page to view a certain worksheet when he logons and enables the customer to see only his worksheets or those of co-workers at his office location or corporate-wide. "Global" templates can also be accessed by all website customers.

Once the worksheet is built or configured with all the SKUs and quantities needed, the customer is ready to order or obtain quote. Referring to FIG. 28, the "Order" pull-down menu leads to the next step in the order process—getting a quote as to product pricing and availability or directing the delivery of product by placing an order. The "Get Quote" is clicked to confirm his account-based pricing and inventory availability. Delivery charges are factored in and can be customized based on the delivery option selected by the customer. The quote page can be bypassed by clicking on "Submit Order" to proceed to the next step.

A quote page is shown in FIG. 29. The account-based pricing line item by line item is shown and a total for the order is displayed at the lower right. Bill-to and ship-to addresses appear at the top. A "Reservation" button may be provided which is then clicked to hold the quote and reserve the inventory for a specified period of time.

Once the customer is satisfied with the quote as to product price and availability, he either clicks "Place Order" or the "Okay" button at the bottom of the page to return to the worksheet page where he can build another worksheet or logs off.

Figure 30:
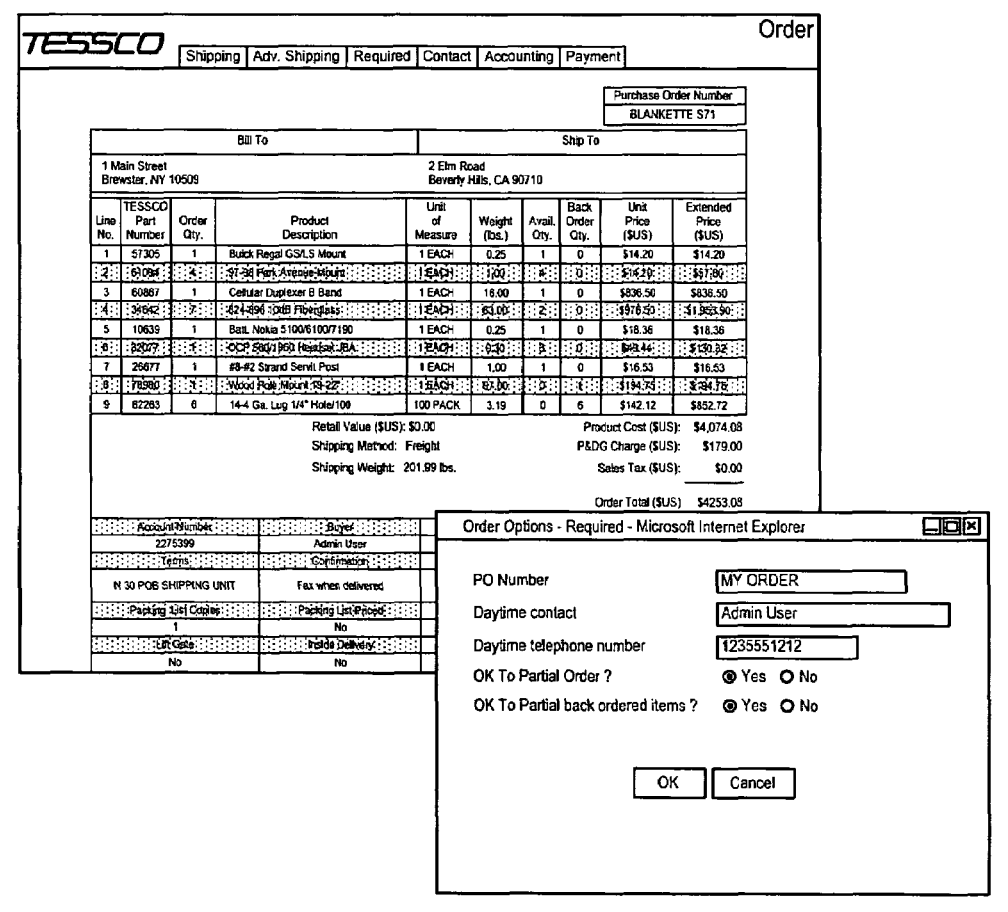

Referring to FIG. 30, the customer may direct the delivery of product by placing the order from the order page by giving the order a purchase order number (P/o number) and specifying the name and phone number of the person to be reached in reference to the order. If the order contains any items that there are on back order status, the customer will be asked whether or not partial shipment of in stock items on the order is authorized.

Figure 31:
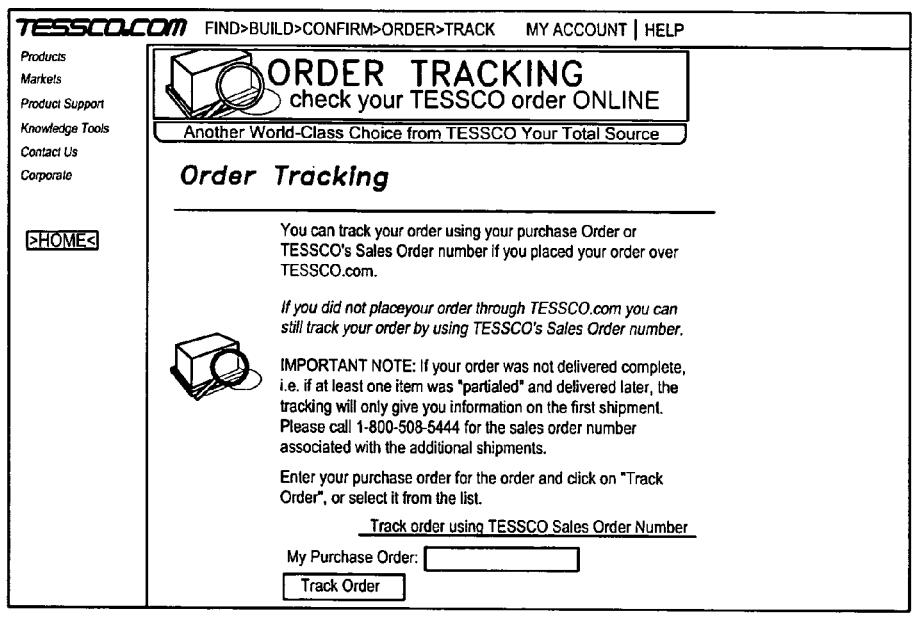

Referring to FIG. 31, the customer's order may be tracked by using either the website sales order (S/O) number or his purchase order (P/O) number for an order the customer wishes to track. An S/O or P/O number may be entered directly into the field or selected from the listing of numbers which appear at the bottom of the page.

Figure 32:
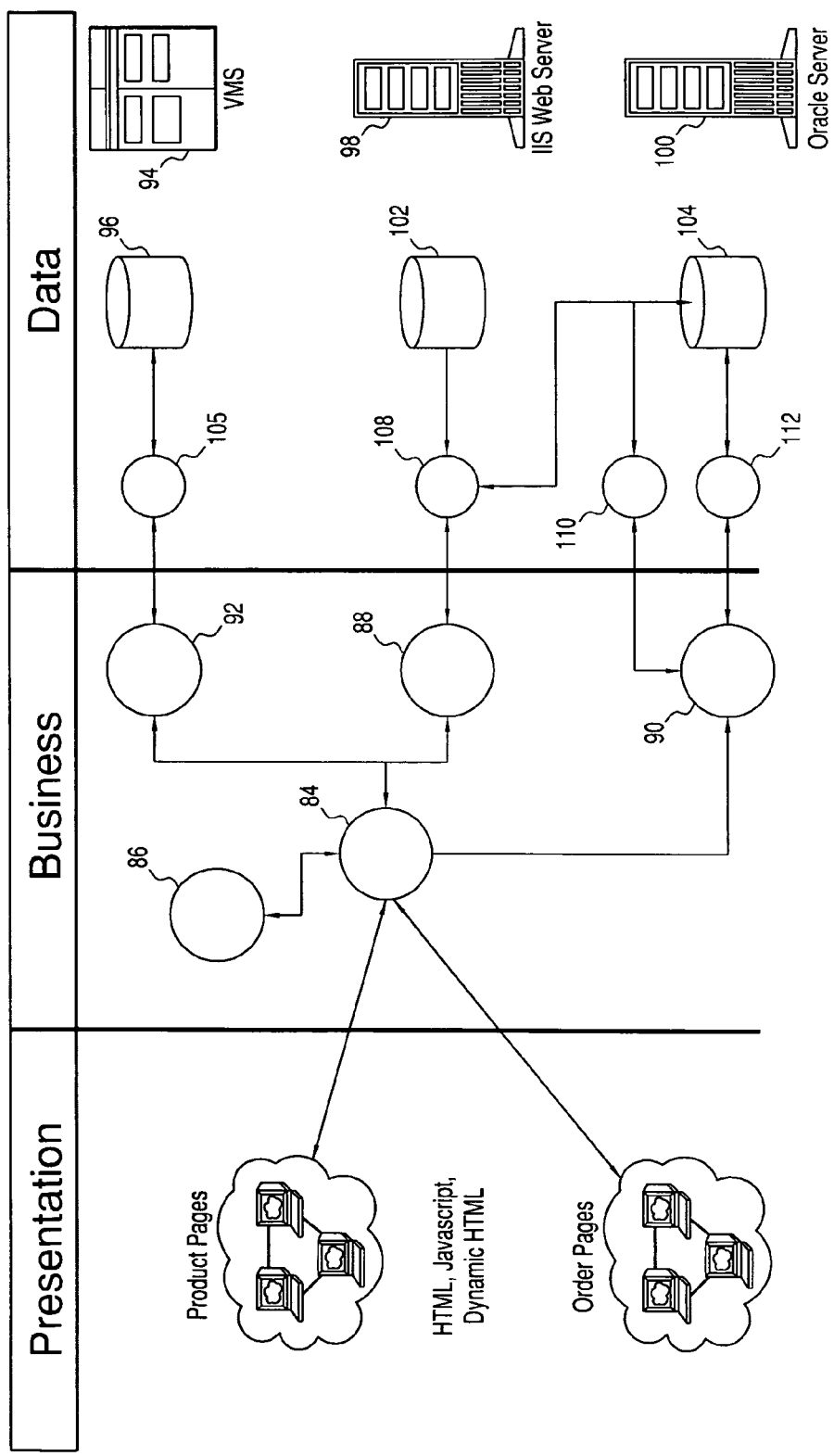
FIG. 32 is a block diagram of a website to implement the online product ordering system of FIG. 1.

The online product ordering system is implemented in a client server system disclosed in FIG. 32. Client computers are connected to the server computers through a network, such as the Internet. The functionality of the website is separated into a presentation layer, a business layer and a data layer. By separating the functionality of the site into these logical categories, changes to any of the layers will have a minimal affect on the site. Enhancements to the software may be incorporated quickly since there are less dependencies among software components.

Web pages are written using a combination of HTML, Javascript and dynamic HTML. Dynamic content to the HTML is served up using Microsoft ASP. These pages handle the navigation, control and display for the customer.

A component 84 handles all communication into and out of the website and delegates tasks to other components. The component 84 implements the business logic. A miscellaneous component 86 includes any ancillary component necessary for business decisions and validation, such as credit card, registry, lists, data robots, error management, and logging components. A component 88 is responsible for managing communication and configuration logic from the product data sources. SKU validation and tuning configuration are handled by this component. A component 90 handles creation and sending of dynamic email messages and email templates. Information about a user and his order can be merged into a blanket email message and sent to various recipients. A component 92 handles the communication between the business layer and the Legacy VMS computer 94 controlling a database 96. All order information as well as specific account/user information flows to and from this datasource 96.

The data layer of the site is comprised of three major data sources. These are the VMS server 94, the Microsoft IIS web server 98 and the UNIX Oracle server 100. The VMS server 94 controls order entry into an order fulfillment Legacy server (not shown) and controls the database 96. The IIS web server 98 runs under Microsoft's NT 4.0 and is responsible for serving the web pages. Its corresponding database 102 runs on another server (not shown) running MS SQL Server 6.5. The Oracle server 100 runs under Compaq TRU 64 UNIX 4.0F and serves up an Oracle 8.5 database 104.

The database 102 contains the electronic Buyers Guide or product catalog for the website. Worksheets and orders are saved in the database 104. The database 102 is searchable by category, manufacturer part number, keyword description or by SKU.

For each database there is a corresponding data interface component 105, 108, 110 or 112. The data interface component 108 communicates with both the databases 102 and 104. The data interface components 110 and 112 both communicate with the database 104.

Communication between the architecture layers takes place through a transport protocol. Communication between the presentation and business layer relies upon HTTP and remote scripting. Communication between the business and data layer relies upon XML and a ACSII text data format or a similar text transport format.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A method for ordering products online, comprising:
   a) providing a server system for connection to a client system, said server system including product and order databases;
   b) allowing the client system to be connected to the server system;
   c) displaying on the client system a worksheet having rows and columns, two of said columns comprising empty fields;
   d) allowing a customer operating the client system to build the worksheet with products desired to be ordered by entry by the customer in the empty fields of the product stock number included in the product database and corresponding quantities;
   e) searching the product database by category and adding the product found to the worksheet; and
   f) allowing the customer to submit the worksheet to the server system to obtain a quote as to product price and availability or direct delivery by ordering the products listed thereon.

2. A method as in claim 1, and further comprising keying in stock numbers for the products included in the product database.

3. A method as in claim 1, and further comprising searching the product database by manufacturer part number included in the product database and adding the product found to the worksheet.

4. A method as in claim 1, and further comprising searching the product database by keyword included in the product database and adding the product found to the worksheet.

5. A method as in claim 1, wherein the worksheet is built by cloning product stock numbers from another worksheet.

6. A method as in claim 1, and further comprising cloning another worksheet.

7. A method as in claim 1, and further comprising cloning a product order.

8. A method as in claim 1, and further comprising importing a template.

9. A method as in claim 1, and further comprising importing a line item from a previous product order.

10. A method as in claim 1, and further comprising importing a line item from a template.

11. A method as in claim 1, and further comprising loading a template into the worksheet and editing each line item as desired.

12. A method as in claim 1, and further comprising loading a template into the worksheet.

13. A method as in claim 1, and further comprising reserving the quote for a predetermined period of time.

14. A system for ordering products online, comprising:
a) a server system including a database for products;
b) said server system including means for displaying a worksheet on a client system;
c) said worksheet including empty fields for entry by a customer of stock numbers and corresponding quantities of the products to be ordered;
d) means for searching for a product from said database by category and adding the product to the worksheet; and
e) means for submitting the filled-in worksheet to order the products listed thereon.

15. A system as in claim 14, and further including means for saving said filled-in worksheet for later retrieval.

16. A system as in claim 14, and further comprising means for cloning said filled-in worksheet.

17. A system as in claim 14, and further including means for saving said filled-in worksheet as a template.

18. A system as in claim 17, and further comprising means for importing product information from an existing template to said worksheet.

19. A system for ordering products online, comprising:
a) a server system for connecting to a client system through the Internet, said server system including a product database;
b) said server system including software for displaying a worksheet on a monitor of the client system;
c) said worksheet including rows and columns;
d) said worksheet including empty fields for entry of stock numbers and corresponding quantities of the products to be ordered, said empty fields being adapted to be filled by a customer operating the client system; and
e) said software including means for searching the product database by category for products to be added to said worksheet.

20. A system as in claim 19, wherein:
a) said software includes a presentation layer;
b) a business layer communicating with said presentation layer; and
c) a data layer communicating with said business layer.

21. A method for ordering products online, comprising:
a) providing a server system for connection to a client system, said server system including product and order databases;
b) allowing the client system to be connected to the server system;
c) displaying on the client system a worksheet having rows and columns, two of said columns comprising empty fields;
d) allowing a customer operating the client system to build the worksheet with products desired to be ordered by entry by the customer in the empty fields of the product stock number included in the product database and corresponding quantities;
e) searching the product database by manufacturer part number included in the product database and adding the product found to the worksheet; and
f) allowing the customer to submit the worksheet to the server system to obtain a quote as to product price and availability or direct delivery by ordering the products listed thereon.

22. A system for ordering products online, comprising:
a) a server system including a database for products;
b) said server system including means for displaying a worksheet on a client system;
c) said worksheet including empty fields for entry by a customer of stock numbers and corresponding quantities of the products to be ordered;
d) means for searching for a product from said database by manufacturer part number and adding the product to the worksheet; and
e) means for submitting the filled-in worksheet to order the products listed thereon.

23. A system for ordering products online, comprising:
a) a server system for connecting to a client system through the Internet, said server system including a product database;
b) said server system including software for displaying a worksheet on a monitor of the client system;
c) said worksheet including rows and columns;
d) said worksheet including empty fields for entry of stock numbers and corresponding quantities of the products to be ordered, said empty fields being adapted to be filled by a customer operating the client system; and
e) said software including means for searching the product database by manufacturer part number for products to be added to said worksheet.

* * * * *